United States Patent [19]

Lehmann et al.

[11] Patent Number: 4,971,656

[45] Date of Patent: Nov. 20, 1990

[54] FLOTATION PROCESS FOR DEINKING PRINTED WASTE PAPER

[75] Inventors: Klaus Lehmann; Andreas Domsch, both of Illertissen; Hans Hawel, Voehringen; Gregor Schuster, Neu-Ulm, all of Fed. Rep. of Germany

[73] Assignee: Chemische Fabrik Gruenau GmbH, Illertissen, Fed. Rep. of Germany

[21] Appl. No.: 332,678

[22] Filed: Mar. 31, 1989

[30] Foreign Application Priority Data

Mar. 31, 1988 [DE] Fed. Rep. of Germany ....... 3811025

[51] Int. Cl.⁵ .............................................. D21C 5/02
[52] U.S. Cl. ........................................... 162/5; 162/8
[58] Field of Search ................................. 162/5, 6, 8, 4

[56] References Cited

U.S. PATENT DOCUMENTS

| 2,116,511 | 5/1938 | Earle | 162/5 |
|---|---|---|---|
| 3,354,027 | 11/1967 | Hossain | 162/5 |
| 3,846,227 | 11/1974 | Mestetsky | 162/5 |
| 3,963,560 | 6/1976 | Mestetsky | 162/5 |
| 4,043,908 | 8/1977 | Roberts | 162/5 |
| 4,231,841 | 11/1980 | Calmanti | 162/8 |
| 4,360,439 | 11/1982 | Calmanti | 162/5 |
| 4,487,655 | 12/1984 | Noetzel | 162/5 |
| 4,586,982 | 5/1986 | Poppel | 162/5 |

FOREIGN PATENT DOCUMENTS

| 13758 | 8/1980 | European Pat. Off. | 162/5 |
|---|---|---|---|
| D. 11549 | 3/1952 | Fed. Rep. of Germany . | |
| 2903150 | 1/1979 | Fed. Rep. of Germany | 162/5 |
| 1379253 | 12/1963 | France | 162/5 |
| 223391 | 12/1984 | Japan | 162/5 |

OTHER PUBLICATIONS

Tappi, "Deinking of Secondary Fibers", Sep., 1980, vol. 63, No. 9, pp. 1, 113–116.
Ullmanns Encyklopädie der technischen Chemie, Band 17, pp. 1, 570–572.

*Primary Examiner*—David L. Lacey
*Assistant Examiner*—Thomas M. Lithgow
*Attorney, Agent, or Firm*—Ernest G. Szoke; Wayne C. Jaeschke; John E. Drach

[57] ABSTRACT

A flotation process for the de-inking of printed wastepaper by treating the paper pulp in the pulper at alkaline pH-values by means of alkali silicate, oxidative bleaches and separating the loosened printing-ink particles from the fibrous material suspension by flotation, in which protein fatty acid condensates are added finely distributed, possibly together with dispersing agents, in a solution or dispersion which is fluid at normal temperature.

20 Claims, No Drawings

FLOTATION PROCESS FOR DEINKING PRINTED WASTE PAPER

BACKGROUND OF THE INVENTION

1. Field of the Invention

This invention relates to a flotation process for de-inking printed waste paper by treating the paper pulp in the pulper at alkaline pH values by means of alkali-metal silicate, oxidative bleaches, alkali metal salt solutions and/or amine salt solutions of protein fatty acid condensates or dispersions of alkaline earth metal salts of protein fatty acid condensates as well as separating the loosened printing ink particles from the fibrous material suspension by flotation.

2. Description of the Related Art

De-inking refers to the selective removal of printing ink from the waste paper fiber suspension. The reusable material is processed into the finished products, e.g. writing paper, printing paper, toilet paper, etc depending on the individual starting material. The essential steps of the de-inking process are at first, the removal of the printing inks from the fibers in a pulper by means of suitable chemicals and then selectively separating the printing inks from the fiber suspension. Both in the flotation- and the wash-de-inking processes, these steps are carried out in an alkaline medium, where the printing ink is removed in flotation cells or washers. The reusable material obtained is then processed into the desired products.

A commonly used chemical formulation can be as follows: (quantities referred to the dry matter content of the waste-paper)

0.5 to 2.0% by weight of alkali-metal hydroxide (100%)
0.2 to 1.5% by weight of soap or fatty acid (100%)
0.05 to 0.1% by weight of nonionic dispersing agent (100%)
2.0 to 5.0% by weight of alkali-metal silicate (water glass)
0.1 to 0.3% by weight of diethylenetriaminepentaacetic acid Na salt (DTPA) (40%)
0.5 to 3.0% by weight of oxidizing bleaching agent (100%)

The effects of the individual chemicals in the flotation process are as follows:

alkali metal hydroxide, preferably sodium hydroxide, causes the fibers to swell thus making it easier to loosen the inter-fiber bonds as well as to separate the printing-ink. This is further promoted by the neutralization or saponification of printing ink binders. Furthermore, sodium hydroxide provides the necessary alkalinity for the neutralization of the fatty acids, which is necessary for their function as collectors. Nonionic dispersing agents cause improved wetting of the fibers by lowering the surface tension of the water, which promotes inter alia the action of the other chemicals, and which essentially results in the loosening of the printing inks and their dispersion. By the dispersion of the printing inks re-absorption into the fibers is prevented or makes it difficult for them to become reattached to the fibers.

The separated pigments are hydrophobized by the collectors, i.e. usually fatty acids or soaps, which makes selective removal possible. With the anionic collectors previously used, together with the alkaline medium, the water hardness formers are of decisive importance for this function, because only their calcium salts cause hydrophobing of the printing ink particles, thus making the latter floatable. Oxidizing bleaching agents prevent or compensate for the yellowing of the wood-containing constituent of the waste paper and in addition—depending on the amount used—cause further bleaching of the fibers. Alkali silicates and DTPA (Diethylene-triaminepenta-acetic acid) are used for their stabilization, which prevent a too rapid decomposition of the bleaching agents by complexing the heavy metals.

According to the end product desired, newspapers, magazines, computer paper, files, etc., but in most cases mixtures of these are used as waste-paper, both the printing-ink system employed and their age playing a decisive role in the possibility of de-inking them.

After the de-inking process the paper is evaluated by measurement of the degree of whiteness, in which the whiteness of the test sheets is compared to that of a standard (e.g. barium sulfate with measurement of the degree of whiteness according to Elrepho) and given in percentages. For example, a waste paper mixture of newspapers and magazines in the ratio 1:1 gives a whiteness of 56 to 60%, where the whiteness of the unprinted margins of this waste paper amounts to approximately 65 to 68%.

German patent application No. DE-OS 29 03 150 a process is described for the de-inking of printed waste paper by treating the paper pulp in the pulper at alkaline pH values by alkali silicate, oxidizing bleaching agents, higher fatty acids or their salts and nonionic dispersing agents, and separation of the loosened printing ink particles from the dyestuff-suspension by flotation, where a fatty acid alkanol amide is additionally used in the pulper.

On the other hand U.S. Pat. No. 4,586,982 describes a similar process, which is differentiated from the above named DE-OS 29 03 150 in that no fatty acid alkanol amide is used in the pulper and in that the fatty acids and/or resin acids and the dispersing agents are used in the form of an oil-in-water-emulsion. The known processes, however, show several disadvantages.

The use of solid fatty acids as collectors necessitates melting apparatus or a heated storage container if they are supplied already melted. Heating is not necessary if fatty acids are used, with a melting point below the normal temperature range, these, however, usually present disadvantages for industrial use. The liquid fatty acids which have a higher melting point only saponify slowly under the reaction conditions in the pulper, such that the soaps forming on the surface of the fatty acid particles make the further saponification of the enclosed fatty acids more difficult and can even prevent it. This fact does not only result in a reduction of the collector effect, but can also lead to an increased flotation of the fibers and felt pollution, through the hydrophobing of the fibers by the unsaponified fatty acids.

In order to overcome these difficulties, according to the prior art saponification units are connected after the storage tanks. The resulting aqueous soap solution must then be permanently heated, until processes, because the latter forms gels at normal temperature, i.e. the intermediate storage containers as well as the dosing pipes including the dosing-head of the dosing pump must be thermally insulated and continuously heated.

If solid soaps are used, a saponification plant is no longer necessary. As the complete solubility of the soap granules is not given in most cases in the conditions dependent on the process, dissolving plants must be installed to prevent negative effects. The disadvantages described above still apply to the resulting soap solution. A further considerable disadvantage of the known methods is to be seen in that the above mentioned formation of calcium soap of the fatty acid, which were first effective as collectors, only successively takes place during the de-inking process in the pulper with the hardness-former of the water used. The reaction time required for this increases the total length of time necessary for the process; an incomplete reaction causes a worse de-inking results, which are also reflected in lower degrees of whiteness. Processes, in which the fatty acids are used in the form of an emulsion also have these disadvantages.

Furthermore in the German Patent Application D 11549 IVa/55b a process for the regeneration of waste paper by an alkaline aqueous liquor is described. The liquors to be used here contain: (a) water glass, (b) at least one oxygen-evolving compound, such as hydrogen peroxide, sodium peroxide, perborate, per-carbonate, (c) at least one protective colloid containing nitrogen in an amide or sulfonamide type bond, (d) at least one nitrogen-free organic compound with a wetting- and washing-effect. A possible protective colloid (component c) is a condensation product of a soluble protein substance or of a higher molecular protein cleavage product with a soap-forming fatty-, resin- or naphthene acid or with an aliphatic or aliphatic-aromatic sulfonic acid. In particular alkyl benzenesulfonic acid salts with 10 to 18 C-atoms in the alkyl radical are used as nitrogen-free wetting agents and detergents. The compounds used in this process as protective colloids reduce the fiber damage or fiber loss which is otherwise observed.

The process described in this German Patent application refers to so-called "wash-de-inking", in which the printing-ink is dispersed in the best possible way by pulping of the waste paper. The printing ink remains in the liquor and is then washed out with the liquor in the subsequent draining stage.

As opposed to this, the process according to the present invention is concerned with what is known as "flotation-de-inking", in which the different wetabilities of the printing-ink and the paper fibers is used for their separation. The hydrophobic printing-ink is flocculated and collected and then separated in the flotation foam.

Details of the differences of the two de-inking processes can be found in: "Ullmanns Encyklopadie der technische Chemie", 4th Edition, Volume 17 (1979), pp. 570 to 572, as well as in "Tappi" (Technical Association of the Pulp and Paper Industry"), Volume 63 (1980), No. 9, pp. 113 to 116. According to this the real difference between the wash process and the flotation process consists in the printing inks separation principle. The actual de-inking chemical in the wash process is a detersive dispersing agent, which is responsible for producing a stable dispersion of separated printing-ink particles and for preventing a renewed adsorption of these particles to the fibers. By contrast the actual de-inking chemical in the flotation process is the so-called collector, which is responsible for causing a specific adsorption of the printing-ink particles in the air bubbles. The two processes are therefore not comparable with each other either as such or with respect to the mode of action of the chemicals used.

With respect to the above mentioned prior art it is an object of the present invention to make available an improved flotation process for de-inking printed waste paper, which does not have the above mentioned disadvantages and furthermore leads to outstanding whiteness levels. In particular the object of the present invention is also to make possible the use of protein fatty acid condensates as collectors, which do not necessitate melting plants or heated storage containers. The present problem can be solved in that in the flotation process for de-inking printed waste paper, protein fatty acid condensates in the form of their alkali metal salts and/or amine salts, if necessary combined with dispersing agents, in molecular distribution in an aqueous solution liquid at normal temperature or in the form of their alkaline earth metal salts which are finely distributed, if necessary together with dispersing agents, in a dispersion which is fluid at normal temperature are used.

DESCRIPTION OF THE INVENTION

Other than in the operating examples, or where otherwise indicated, all numbers expressing quantities of ingredients or reaction conditions used herein are to be understood as modified in all instances by the term "about".

The invention therefore relates to a flotation process for de-inking printed waste paper comprising the steps of (1) preparing a treating solution by adding to an aqueous alkaline solution an alkali metal silicate, an oxidative bleaching agent, and an aqueous collector selected from the group consisting of an aqueous solution of an alkali metal salt of a protein fatty acid condensate, an aqueous solution of an amine salt of a protein fatty acid condensate, an aqueous dispersion of alkaline earth metal salt of a protein fatty acid condensate or mixtures thereof, wherein said protein fatty acid condensate is a compound of the formula I or II

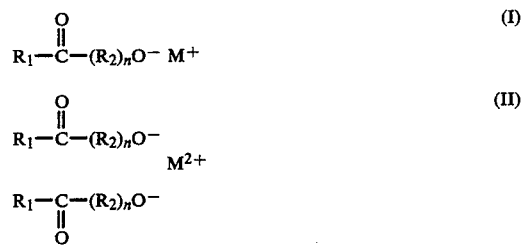

or mixtures thereof, and wherein $R_1$ is a linear or branched alkyl-, alkenyl-, hydroxyalkyl- or hydroxyalkenyl radical having 8 to 22 C-atoms or a condensed-polycyclic radical or mixtures thereof, $R_2$ is a repeat unit of a polypeptide, $Me^+$ is an alkali-metal radical or an organic amine radical, $Me^{2+}$ is an alkaline earth metal radical and n is an integer having a value of from 1 to about 50; (2) treating the waste paper in a pulper with said treating solution to detach printing ink particles from the waste paper pulp fibers; and (3) separating the detached printing ink particles from the pulp fibers by flotation.

For purposes of this invention, a repeat unit, $R_2$, of a polypeptide in compounds of formula I and II above stands for an amino acid residue having the structure

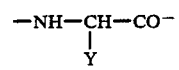

wherein the terminal nitrogen atom of the amine-terminated repeat unit is bonded to the carbonyl group of the fatty acid moiety and wherein Y can be any moiety bonded to the o-carbon of an amino acid that is normally found in a protein. For example, Y can be H in the case of where the repeat unit is glycine, Y can be methyl in the case of where the repeat unit is alanine, Y can be benzyl in the case of where the repeat unit is phenylalanine, Y can be —$CH_2SH$ in the case of where the repeat unit is cysteine, etc. Other possible values of Y can be ascertained from a list of the amino acids found in proteins obtainable from most textbooks of organic chemistry.

Sodium salts, potassium salts, lithium salts or their mixtures as well as ammonium salts can be used as alkali metal radicals of the protein fatty acid condensate.

Monoethanolamine salts, diethanolamine salts, triethanolamine salts, morpholine salts and/or their mixtures, for example, can be used as the organic amine radical of the protein fatty acid condensate.

The corresponding salts of magnesium, calcium, strontium or barium or mixtures of these, for example, can be considered as alkaline earth metal salts of protein fatty acid condensates. However, protein fatty acid condensates are preferably used in the form of their calcium salts. If the following embodiments therefore only refer to calcium salts, it can be taken that these embodiments refer in the same way to the other alkaline earth metal salts.

When protein fatty acid condensates are used in the form of their alkali- and/or amine salts—according to the invention—the fact that they are already in molecular distribution (that is, they are dissociated into individual molecules as opposed to being present in an agglomerated or undissociated state) in their aqueous solutions has the result that no reaction time is necessary for the reaction with the alkali hydroxide of the chemical liquor, which had been a prerequisite for the function of anionic collectors, based on fatty acids, used until now. A spontaneous complete reaction takes place to the calcium salts which results from the water hardness-formers, which then work as selective printing-ink collectors. The extraordinary fineness of the flocculation and its product-specific properties ensure an excellent collector effect.

When protein fatty acid condensates are used in the form of their alkaline earth metal salts according to the invention however, no reaction time is necessary for the reaction with the alkali-metal hydroxide of the chemical liquor and the water hardness-formers, which had been a prerequisite for the anionic collectors, based on fatty acids or soaps used until now. The process according to the invention therefore also allows the use of soft water. The very fine distribution of the calcium salts and their product-specific properties ensures an excellent collector effect, which also results in better whiteness levels.

Protein fatty acid condensate-salt solutions, dispersions of protein fatty acid condensates-alkaline earth metal salts as well as their combinations with dispersers can be introduced directly from the storage tank to the de-inking process at any point without any pre-handling, as either the necessary reaction occurs spontaneously or—if calcium salts are used—a reaction is no longer necessary, so the collector function takes place spontaneously. Also because of this no disadvantages occur where pulping is carried out in the high consistency range with pulp densities from 15 to 20%. Even an addition immediately before the de-inking aggregate is possible without disadvantages.

As a result of their increased surface activity the protein fatty acid condensate salt solutions, dispersions of protein fatty acid condensate—alkaline earth metal salts as well as their combinations with dispersers produce an excellent detachment and collection of the printing-ink particles.

The protein fatty acid condensates to be used according to the invention are known from the prior art. For example they are described in "Seifen, Ole, Fette, Wachse" Volume 91 (1965), pp. 477 to 482. The preparation of these protein fatty acid condensates can be carried out for example according to the two-stage process described in the following:

(A) Preparation of protein hydrolysates;
(B) Condensation of the protein hydrolysates with fatty acid chlorides according to Schotten-Baumann.

(A) Preparation of protein fatty acid hydrolysate

Protein fatty acid hydrolysates are prepared by acid or alkaline hydrolysis of a collagen-containing material.

1. Acid hydrolysis of a collagen-containing material

The collagen-containing material is added with diluted sulfuric acid in a suitable reactor and hydrolysed for approximately 8 to 10 hours at 85° to 95° C. After the hydrolysis has been completed a calcium hydroxide dispersion is added to the charge, by which the polypeptide is transferred to the calcium salt and the disintegrated material precipitates as calcium sulfate. The dispersion is filtered. A clear solution of calcium peptides is obtained in the filtrate. This solution can be evaporated and after concentration can be directly condensed with the fatty acid chlorides to protein fatty acid condensate calcium salts. Sodium or potassium salts of the protein hydrolysate are necessary for the preparation of alkali salts of the protein fatty acid condensate. These are obtained by precipitating the calcium peptide solution with sodium carbonate or potassium carbonate, filtering off the precipitated calcium carbonate and concentrating the sodium or potassium protein hydrolysate thus obtained and then condensing with fatty acid chloride.

2. Alkaline hydrolysis

The collagen-containing material is put together with a calcium hydroxide dispersion in a suitable reactor, hydrolysed for 6 to 10 hours at 85° to 95° C. and the disintegrated material is filtered from the residue. The filtrate contains calcium peptide, which can then be converted directly with the fatty acid chloride to protein condensate after concentrating. The calcium peptide solution is precipitated with the sodium carbonate or potassium carbonate, as described previously, for the preparation of the alkali salts of the protein fatty acid condensates, the resulting precipitate is filtered off and the solution is evaporated. The alkali peptides can then be condensed with the fatty acid chlorides.

(B) Preparation of the protein fatty acid condensates

The preparation of the protein fatty acid condensates is carried out as has been mentioned previously according to Schotten-Baumann. A protein solution adjusted to be alkaline, is added to fatty acid chlorides. The process is carried out as follows: The protein hydrolysate solution is put in a suitable vessel with a stirrer, adjusted to alkalinity and the appropriate amount of fatty acid chloride is added at a temperature of 40° C. to 60° C., whereupon the hydrochloric acid resulting from the condensation is trapped by the further addition of alkali. After completion of the addition of both chemicals the subsequent reaction is allowed to continue for approximately one hour, then the material is adjusted to the desired total solids content and pH-value. The protein fatty acid condensate solutions thus obtained can then be used for the de-inking process according to the invention.

All proteins of animal or vegetable origin can be used here as protein-containing material, for example soya protein, keratin or in particular collagen itself. The lipophilic residue of the protein fatty acid condensate can consist of alkyl-, alkenyl-, hydroxyalkyl- or hydroxyalkenyl-radicals with 8 to 22 C-atoms, which can be linear, branched, even or odd numbered or condensed-polycyclic. Mixtures of the radicals named can also be used. Such radicals with 12 to 18 C-atoms are preferred. The following can be named as examples of the hydrocarbon radicals to be used in the sense of the invention: fatty acids with 12 to 18 C-atoms, singly or in mixtures, tallow fatty acids, coconut fatty acids, synthetic fatty acids with acid values in the range of 190 to 200, abietic acid, animal fatty acids with 12 to 18 C-atoms or distilled mixed vegetable oil fatty acid, which has, for example, the following C-chain distribution:

| approx. | 3% | $C_{12}$-lauric fatty acid |
| --- | --- | --- |
| approx. | 10/12% | $C_{14}$-myristic acid |
| approx. | 15/20% | $C_{16}$-palmitic acid |
| approx. | 18/25% | $C_{18}$-stearic acid |
| approx. | 45/50% | $C_{18}$-oleic acid |
| approx. | 5% | $C_{18}$-linoleic acid |

If "normal temperature" is mentioned in connection with protein fatty acid condensates, then the usual ambient or room temperature is to be understood, which can possibly be from $+4°$ to $+30°$ C. The de-inking process itself is preferably carried out at temperatures in the range of 40° to 50° C.; naturally the aqueous solutions or the dispersions are also fluid in this temperature range.

The alkaline earth metal salts of the protein fatty acid condensate are present in the dispersion in the finely distributed form necessary or usual for stable dispersions.

In the sense of the present invention protein fatty acid condensate solutions or dispersions with a solids content of 10 to 50% by weight, based on the dispersion as a whole are preferably used. Solids contents of 30 to 45% by weight, referred to the whole dispersion are particularly preferred. Furthermore it is preferred in the sense of the invention that aqueous solutions or dispersions with a protein fatty acid condensate salt content of 70 to 100% by weight, referred to the previously given solids contents are used.

The aqueous solutions or dispersions to be used in the sense of the invention can also contain nonionic and/or anionic dispersing agents. Nonionic dispersing agents, which are added subsequently, are preferred here. In this, preferably 1 to 40% by weight, non-ionic and/or anionic dispersing agents, referred to the protein fatty acid condensates, are used. If anionic dispersing agents are used, they usually amount to 1 to 40% by weight, referred to the protein fatty acid condensate salts. Alkylpolyglycolethers, iso-alkylpolyglycolethers, hydroxylalkylpoly-glycolethers, alkenylpolyglycolethers, alkylarylpolyglycolethers, acyl-polyglycolesters and polyoxyethyleneglycerine fatty acid esters, each with 8 to 22 C-atoms in the hydrocarbon radical and 6 to 30 mole of ethylene oxide are preferably used, for example, as non-ionic dispersing agents.

Alkylsulfonates, alkylarylsulfonates, alkylsulfates, alkylpolyglycol-ethersulfates and alkylarylpolyglycolethersulfates can, for example, be used as anionic dispersing agents. The ethylene oxide content of the alkylpolyglycolethersulfates and the alkylarylpolyglycolether-sulfates amounts to 2 to 25 mole. The anionic dispersing agents named have hydrocarbon radicals with 8 to 22 C-atoms. The anionic dispersing agents are usually used in the form of their alkali- and/or amine salts.

According to a preferred embodiment of the present invention the flotation process for the de-inking of waste paper is carried out in such a way that a combination of the following components is added into the pulper:

(a) 0.5 to 2% by weight of sodium hydroxide (100%):

(b) 2 to 5% by weight of alkali-metal silicate;

(c) 0.1 to 0.3% by weight of diethylenetriamine-penta-acetic-acid-sodium salt (DTPA) (40% aqueous solution);

(d) 0.5 to 3% by weight of hydrogen peroxide (100%):

(e) 0.2 to 1.5% by weight of protein fatty acid condensate-alkali-salt solution or amine salt solution or dispersions of protein fatty acid condensates-alkaline earth metal salts;

(f) 0 to 0.1% by weight of nonionic dispersing agent. The given amounts each refer to the amount of waste paper used.

Commercial water glass solutions—sodium-water glass and/or potassium water glass are generally used as alkali-metal silicate (component b). Sodium-water glass with a weight ratio $SiO_2/Na_2O$ of 3.3:1 is preferred. The solutions or dispersions (component e) to be used correspond to the above statements.

In addition to the dispersing agents, which can possibly be contained in the protein fatty acid condensate solutions or protein fatty acid condensate dispersions, further non-ionic dispersing agents (component f) can be added in the process. With regard to the type of non-ionic dispersing agents to be used here the above statements apply in the same way. It is preferable that 0.05 to 0.1% by weight of non-ionic dispersing agents, again referred to the waste-paper, is used; in particular $C_{8-22}$-alkyl-polyglycolether and/or $C_{8-22}$-acyl-polyglycolester, each with 6 to 30 mole of ethylene oxide. The invention is illustrated by the following examples.

Examples 100 g of bone-dry (=110 g air-dry) of printed waste-paper, consisting of 100% daily newspapers, is put in 1890 ml of an aqueous chemical liquor and disintegrated at a temperature of approximately 45° C. by means of dispersing disks (2500 r.p.m.) for 15 minutes. The degree of hardness of the water is at approximately 17 °d.

The chemicals used and their concentrations—each referred to the dry weight of the waste-paper—were as follows:

1.0% of sodium hydroxide (100%)
3.0% of soda-water glass
(Weight ratio $SiO_2/Na_2O=3.3:1$)
0.2% of DTPA (commercial product, 40%)
0.85% of hydrogen peroxide (100%)
x % of collector (See Examples and Comparative examples)

The composition of the "collector" was varied and can be seen in the following examples according to the invention as well as the comparative examples. The reaction time after pulping of the material amounted to 2 hours, corresponding to the swelling time in the chests.

Then the 5% pulp suspension was filled up to 4000 ml with water of 17 °d and deflaked for 5 minutes. The deflaked pulp suspension was then filled with water of the above degree of hardness in a laboratory flotation cell to the level of the froth overflow of the cell, and then floated for 10 minutes, during which the level was maintained at the foam overflow height by the addition of water.

The resulting reusable material was then thickened to a density of approximately 20%. The thickened reusable material was then diluted to a pulp density of approximately 4% by the addition of 800 ml of water of approximately 17 °d, pulped and acidified with dilute sulfuric acid to a pH-value of 6.

About 100 g of this pulp suspension was then filled with water up to 500 ml, which produced a pulp density of approximately 0.8%, and then suction- filtered through a filter paper (diameter 12 cm). After smoothing, the sheet so obtained was dried. The degree of whiteness was measured with an Elrepho R 457.

For the following examples a protein fatty acid condensate based on a collagen-hydrolysate with an average molar weight of 100 to 5000 is used, i.e. $R_1$ corresponds to a polypeptide radical of a hydrolysed collagen and n is in the range of 1 to 50.

EXAMPLE 1

Operating as previously described, 0.7% by weight of an approximately 33% aqueous potassium salt solution of a protein fatty acid condensate in which R corresponded to the hydrocarbon radical of an iso-stearic acid was used as the collector. Degree of whiteness: 57.8%

EXAMPLE 2

Operating as previously described, 0.35% by weight of an approximately 40% aqueous solution, consisting of 90 parts of an approx. 33% aqueous potassium salt solution of a protein fatty acid condensate, in which $R_1$ corresponded to the hydrocarbon radical of a coconut fatty acid and 10 parts alkylpolyglycolether—20 EO was used as the collector. Degree of whiteness: 58.3%

EXAMPLE 3

Operating as previously described, 0.35% by weight of an approximately 40% aqueous solution, consisting of 90 parts of an approx. 33% aqueous potassium salt solution of a protein fatty acid condensate, in which $R_1$ corresponded to the hydrocarbon radical of a coconut fatty acid and 10 parts acylpolyglycolester—20 EO was used as the collector. Degree of whiteness: 57.9%

EXAMPLE 4

Operating as previously described, 0.35% by weight of an approximately 40% aqueous solution, consisting of 90 parts of an approx. 33% aqueous potassium salt solution of a protein fatty acid condensate, in which $R_1$ corresponded to the hydrocarbon radical of a distilled mixed vegetable oil fatty acid and 10 parts polyoxyethylenglycerine fatty acid ester—20 EO was used as the collector. Degree of whiteness: 60.6%

EXAMPLE 5

Operating as previously described, 0.7% by weight of an approximately 38% calcium salt dispersion of a protein fatty acid condensate was used as the collector, in which $R_1$ corresponded to the hydrocarbon radical of a coconut fatty acid. Degree of whiteness: 58.5%

EXAMPLE 6

Operating as previously described, 0.7% by weight of an approximately 38% calcium salt dispersion of a protein fatty acid condensate was used as the collector, in which $R_1$ corresponded to the hydrocarbon radical of a mixed vegetable oil fatty acid. Degree of whiteness: 57.8%

EXAMPLE 7

Operating as previously described, 0.7% by weight of an approximately 38% calcium salt dispersion of a protein fatty acid condensate was used as the collector, in which $R_1$ corresponded to the hydrocarbon radical of abietic acid. Degree of whiteness: 57.7%

EXAMPLE 8

Operating as previously described, 0.7% by weight of an approximately 38% calcium salt dispersion of a protein fatty acid condensate was used as the collector, in which $R_1$ corresponded to the hydrocarbon radical of an oleic (JZ 88–92) acid. Degree of whiteness: 58.1%

EXAMPLE 9

Operating as previously described, 0.7% by weight of an approximately 38% calcium salt dispersion of a protein fatty acid condensate was used as the collector, in which $R_1$ corresponded to the hydrocarbon radical of an iso-stearic acid. Degree of whiteness: 58.9%

EXAMPLE 10

Operating as previously described, 0.35% by weight of an approximately 44% calcium salt dispersion consisting of 90 parts of an approx. 38% calcium salt dispersion of a protein fatty acid condensate, in which $R_1$ corresponded to the hydrocarbon radical of a coconut fatty acid and 10 parts alkylpolyglycolether—20 EO, was used as the collector. Degree of whiteness: 57.8

EXAMPLE 11

Operating as previously described, 0.35% by weight of an approximately 44% calcium salt dispersion consisting of 90 parts of an approx. 38% calcium salt dispersion of a protein fatty acid condensate, in which $R_1$ corresponded to the hydrocarbon radical of a coconut fatty acid and 10 parts alkylpolyglycolethersulfate-Na-salt was used as the collector. Degree of whiteness: 58.0%

COMPARATIVE EXAMPLE 1

Operating as previously described, in which 0.7% by weight of the commercial de-inking soap (sodium soap of $C_{10-18}$-fatty acids) was used as the collector. Degree of whiteness: 57.4%

COMPARATIVE EXAMPLE 2

Operating as previously described, 0.7% by weight of a commercial emulsion of fatty acids and/or resinic acids with more than 10 C-atoms was used as the collector. Degree of whiteness: 55.9%.

As the comparative examples—which correspond to the prior art—show, carrying out the process in the manner according to the invention results in a considerably better degree of whiteness, in which it must be noted that a rise in the degree of whiteness by just 1% represents a considerable improvement. In other words, this means that—with the same process duration—the process according to the prior art produces worse de-inking results. On the other hand, in the process according to the invention an immediate selective flotation occurs, which is also shown in the higher degrees of whiteness.

COMPARATIVE EXAMPLE 3

The following comparative experiments relate to the above mentioned German Patent application D 11549 IV a/55b, in which among other things the use of protein fatty acid condensate products in wash-de-inking is described. Furthermore the following comparative experiments are carried out in the flotation process—as used in the sense of the invention.

Waste-paper consisting of 100% color-printed illustration paper (Degree of whiteness 46.5%) was used for the tests.

Test 3.1 (according to the invention)

Chemical formulation and process implementation analogous to Example 1. Resulting in a degree of whiteness of 59.9%

The difference between the degree of whiteness obtained here and that obtained in Example 1, is explained by the fact that a different type of waste-paper was used in Example 1.

Test 3.2 (comparison)

A protein fatty acid condensate analogous to Test 3.1 was added in de-mineralized water in a formulation according to Example 2 of the above mentioned German Patent application. The waste-paper was treated for 2 hours at 75° C. in the pulper and subsequently processed in a laboratory flotation cell. A strong foam formation took place. A large part of the foam was removed, in order to allow the process to continue. A degree of whiteness of 50.4% resulted.

Test 3.3 (comparison)

Implementation analogous to Test 3.2; the water returned from Test 3.2 after the foam had been removed was used and—as far as necessary—supplemented with de-mineralized fresh water. Result: strong foaming as in Test 3.2; degree of whiteness attained 49.35%

Test 3.4 (comparison)

Implementation analogous to Test 3.2; water returned from Test 3.3 after removal of the foam was used and—as far as necessary—supplemented with de-mineralized fresh water. Result: renewed strong foaming; degree of whiteness attained 49%.

Result

The above comparative tests show, that the formulation described in the German Patent application D 11549 IVa/55b produces unsatisfactory results in the de-inking of waste-paper when the flotation process is carried out. The strong foam formation considerably hinders an optimum flotation of the dissolved printing-ink particles. This is shown in the lesser degree of whiteness in Experiment 3.2 in comparison to 3.1.

Moreover the flotation process in practice—for reasons of environmental protection—is used with a closed-circulation water system and the water returned is used for the pulping of a new waste-paper charge. The foam formed however remains in the circulation and leads to an increasing pollution of the remaining water. This is shown by the reduced degree of whiteness of the Experiments 3.3 and 3.4—in comparison to the Experiment 3.2.

From the teaching of the German Patent Application, however, the expert cannot infer the suggestion of using in a flotation process in the sense of the present invention the protein fatty acid condensation products described there as protection colloids.

We claim:

1. A process for de-inking printed waste paper comprising the steps of (1) preparing a treating solution by adding to an aqueous alkaline solution an alkali-metal silicate, an oxidative bleaching agent, and an aqueous collector selected from the group consisting of an aqueous solution of an alkali metal salt of a protein fatty acid condensate, an aqueous solution of an amine salt of a protein fatty acid condensate, an aqueous dispersion of alkaline earth metal salt of a protein fatty acid condensate or mixtures thereof, wherein said protein fatty acid condensate is a compound of the formula I or II

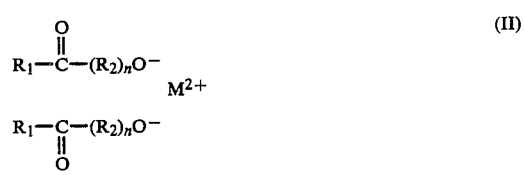

or mixtures thereof, and wherein $R_1$ is a linear or branched alkyl-, alkenyl-, hydroxyalkyl- or hydroxyalkenyl radical having 8 to 22 C-atoms or a condensed-polycyclic radical or mixtures thereof, $R_2$ is a repeat unit of a protein, $M^+$ is an alkali-metal radical or an organic amine radical, $M^{2+}$ is an alkaline earth metal radical and n is an integer having a value of from 1 to about 50; (2) treating the waste paper in a pulper with said treating solution to detach printing ink particles from the waste paper pulp fibers; and (3) separating the detached printing ink particles from the pulp fibers by flotation.

2. The process of claim 1 wherein said alkali metal salt is selected from the group consisting of lithium, sodium, potassium salt or mixtures thereof.

3. The process of claim 1 wherein said amine salt is selected from the group consisting of monoethanolamine, diethanolamine, triethanolamine, morpholine salt or mixtures thereof.

4. The process of claim 1 wherein said alkaline earth metal salt is selected from the group consisting of magnesium, calcium, strontium, barium or mixtures thereof.

5. The process of claim wherein $R_1$ is a linear or branched alkyl or alkenyl group having from 12 to 18 carbon atoms.

6. The process of claim 5 wherein in the compounds of formula I and II the

moiety is derived from the group consisting of fatty acids, coconut fatty acids, synthetic fatty acids having an acid number of from about 190 to about 200, abietic acid, or animal fatty acids having from 12 to 18 carbon atoms.

7. The process of claim 1 wherein said aqueous collector is further comprised of a nonionic dispersing agent, an anionic dispersing agent or mixtures thereof.

8. The process of claim 7 wherein said nonionic dispersing agent is present in said aqueous collector in an amount equal to from about 1% to about 40% by weight of said protein fatty acid condensate.

9. The process of claim 7 wherein said anionic dispersing agent is present in said aqueous collector in an amount equal to from about 1% to about 40% by weight of said protein fatty acid condensate.

10. The process according to claim 8 wherein said nonionic dispersing agent is a compound of the formula III $$R_3-(CH_2CH_2O)_mH \tag{III}$$

wherein $R_3$ is an acyl, alkoxyl, alkenoxyl, hydroxy-substituted alkoxyl, phenyl, or alkyl-substituted phenyl group having from about 8 to atoms 22 carbon atoms, m is an integer having a value of from about 6 to about 30.

11. The process of claim 10 wherein said compound of formula III is selected from the group consisting of alkylpolyglycolether, iso-alkylpolyglycolether, hydroxyalkylpolyglycolether, alkenylpolyglycolether, alkylarylpolyglycolether, acylpolyglycolester and polyoxyethyleneglycerine fatty acid ester.

12. Process according to claim 9 wherein said anionic dispersing agent is selected from the group consisting of alkylsulfonate, alkylarylsulfonate, alkylsulfate, alkylpolyglycolether- sulfate having from about 2 to about 25 moles of ethylene oxide per mole of alkylpolyglycolethersulfate, or alkylarylpolyglycolethersulfate having from about 2 to about 25 moles of ethylene oxide per mole of alkylarylpolyglycolethersulfate.

13. A process for de-inking printed waste paper comprising the steps of (1) providing a treating solution comprising (as weight % of dry matter content of the waste paper) (a) 0.5 to 2% by weight of sodium hydroxide (100%), (b) 2 to 5% by weight of alkali-metal silicate, (c) 0.1 to 0.3% by weight of diethylene-triamine-penta-acetaic acid—sodium salt (40% aqueous solution (d) 0.5 to 3% by weight of hydrogen peroxide (100%), (e) 0.2 to 1.5% by weight of a liquid collector selected from the group consisting of an aqeuous solution of an alkali metal salt of a protein fatty acid condensate, an aqueous solution of an amine salt of a protein fatty acid condensate, an aqueous dispersion of alkaline earth metal salt of a protein fatty acid condensate or mixtures thereof, wherein said protein fatty acid condensate is selected from the group consisting of a compound of the formula I $$R_1-\underset{O}{\overset{\parallel}{C}}-(R_2)_nO^-\ M^+ \tag{I}$$

or II $$\begin{array}{c} R_1-\underset{O}{\overset{\parallel}{C}}-(R_2)_nO^- \\ \\ R_1-\underset{O}{\overset{\parallel}{C}}-(R_2)_nO^- \end{array} M^{2+} \tag{II}$$

or mixtures thereof, and wherein $R_1$ is selected from the group consisting of a linear or branched alkyl-, alkenyl-, hydroxyalkyl- or hydroxyalkenyl radical having 8 to 22 C-atoms or a condensed-polycyclic radical or mixtures thereof, $R_2$ is a repeat unit of a protein, $M^+$ is an alkali-metal radical or an organic amine radical, $M^{2+}$ is an alkaline earth metal radical and n is an integer having a value of from 1 to about 50; (f) less than about 0.1% by weight of a nonionic dispersing agent; (2) treating the waste paper in a pulper with said treating solution to detach the printing ink particles from the pulp fibers; and (3) separating the detached printing ink particles from the pulp fibers by flotation.

14. The process of claim 13 wherein said nonionic dispersing agent is a $C_8$–$C_{22}$ alkylpolyglycol ether having from about 6 to about 30 moles of ethylene oxide.

15. The process of claim 14 wherein said alkylpolyglycol ether is present in an amount equal to from about 0.05% to about 0.1% by weight.

16. The process of claim 13 wherein said nonionic dispersing agent is a $C_8$–$C_{22}$ acylpolyglycol ester having from about 6 to about 30 moles of ethylene oxide.

17. The process of claim 16 wherein said acylpolyglycol ester is present in an amount equal to from about 0.05% to about 0.1% by weight.

18. The process of claims 1 or 12 wherein the solids content of said aqueous collector is from about 10% to about 50% by weight.

19. The process of claim 18 wherein the solids content of said aqueous collector is from about 30% to about 45% by weight.

20. The process of claim 18 wherein the % by weight of protein fatty acid condensate in said solids is from about 70% to about 100%.

* * * * *

UNITED STATES PATENT AND TRADEMARK OFFICE
CERTIFICATE OF CORRECTION

PATENT NO. : 4,971,656

DATED : November 20, 1990

INVENTOR(S) : Klaus Lehmann et al.

It is certified that error appears in the above-identified patent and that said Letters Patent is hereby corrected as shown below:

At Claim 6, Column 12, line 66, add --tallow--after "of" and before "fatty".

At Claim 20, Column 14, line 49, "%" should read --percent--.

Signed and Sealed this

Ninth Day of June, 1992

*Attest:*

DOUGLAS B. COMER

*Attesting Officer*     *Acting Commissioner of Patents and Trademarks*